United States Patent
Richards et al.

(10) Patent No.: US 8,561,081 B1
(45) Date of Patent: Oct. 15, 2013

(54) SYSTEM AND METHOD FOR DYNAMIC BROKERING OF DIGITAL CONTENT REQUESTS

(75) Inventors: Mark Richards, Brighton, CO (US); Curtis Kendall, Royal Oak, MI (US)

(73) Assignee: Accenture Global Services Limited, Dublin (IE)

( * ) Notice: Subject to any disclaimer, the term of this patent is extended or adjusted under 35 U.S.C. 154(b) by 1425 days.

(21) Appl. No.: 11/983,878

(22) Filed: Nov. 13, 2007

(51) Int. Cl.
*G06F 9/54* (2006.01)

(52) U.S. Cl.
USPC ............... 719/313; 725/16; 725/87; 725/97; 725/105; 725/115

(58) Field of Classification Search
None
See application file for complete search history.

(56) References Cited

U.S. PATENT DOCUMENTS

| | | | |
|---|---|---|---|
| 5,550,602 | A | 8/1996 | Braeuning |
| 5,805,762 | A | 9/1998 | Boyce et al. |
| 6,484,199 | B2 | 11/2002 | Eyal |
| 6,697,944 | B1 | 2/2004 | Jones et al. |
| 6,763,177 | B1 | 7/2004 | Abe et al. |
| 6,768,811 | B2 | 7/2004 | Dinstein et al. |
| 6,990,497 | B2 | 1/2006 | O'Rourke et al. |
| 7,224,837 | B2 | 5/2007 | Olshansky et al. |
| 8,032,421 | B1 * | 10/2011 | Ho et al. ...................... 705/26.1 |
| 2002/0032019 | A1 | 3/2002 | Marks et al. |
| 2003/0028623 | A1 * | 2/2003 | Hennessey et al. ............ 709/219 |
| 2003/0087638 | A1 * | 5/2003 | Taylor ............................. 455/445 |
| 2003/0139893 | A1 | 7/2003 | Barbour et al. |
| 2003/0171996 | A1 * | 9/2003 | Chen et al. ....................... 705/26 |
| 2004/0068443 | A1 * | 4/2004 | Hopson et al. .................. 705/26 |
| 2004/0246376 | A1 * | 12/2004 | Sekiguchi et al. ............ 348/468 |
| 2005/0262259 | A1 | 11/2005 | O'Rourke et al. |
| 2006/0015201 | A1 | 1/2006 | Lapstun et al. |
| 2006/0015904 | A1 | 1/2006 | Marcus |
| 2006/0026065 | A1 | 2/2006 | Bolatti et al. |
| 2006/0116899 | A1 | 6/2006 | Lax et al. |
| 2006/0129631 | A1 | 6/2006 | Na et al. |
| 2006/0161952 | A1 | 7/2006 | Herz et al. |
| 2006/0168088 | A1 * | 7/2006 | Leighton et al. .............. 709/207 |

(Continued)

FOREIGN PATENT DOCUMENTS

| | | |
|---|---|---|
| EP | 711084 | 5/1996 |
| EP | 1387583 | 11/2005 |

(Continued)

OTHER PUBLICATIONS

Edge Side Includes (ESI) Overview, 2001, pp. 1-7.*

(Continued)

*Primary Examiner* — Lechi Truong
*Assistant Examiner* — Syed Roni
(74) *Attorney, Agent, or Firm* — Mannava & Kang, P.C.

(57) ABSTRACT

A system provides dynamic brokering of digital content requests. The system includes a conditional scheduler configured for appropriating location data and metadata, both pertaining to the digital content, via a communicative coupling with a content management system. The conditional scheduler produces schedule data and delivery rules pertaining to the digital content. The system further includes a plurality of content broker servers. The content broker server receives content data, such as content location data, the schedule data and the delivery rules, from the conditional scheduler. The content broker server receives a digital content request from a client player. The content broker server dynamically assembles a set of content retrieval instructions based upon the content data when a digital content request is received from the client player.

26 Claims, 7 Drawing Sheets

(56) References Cited

U.S. PATENT DOCUMENTS

| | | |
|---|---|---|
| 2006/0169769 A1 | 8/2006 | Boyarsky et al. |
| 2006/0187927 A1 | 8/2006 | Melampy et al. |
| 2006/0253327 A1 | 11/2006 | Morris et al. |
| 2006/0256739 A1 | 11/2006 | Seier et al. |
| 2006/0268667 A1 | 11/2006 | Jellison et al. |
| 2006/0282533 A1 | 12/2006 | Steelberg et al. |
| 2007/0061201 A1 | 3/2007 | Ellis et al. |
| 2007/0061202 A1 | 3/2007 | Ellis et al. |
| 2007/0061203 A1 | 3/2007 | Ellis et al. |
| 2007/0061204 A1 | 3/2007 | Ellis et al. |
| 2007/0118590 A1 | 5/2007 | Giacalone |
| 2007/0121430 A1 | 5/2007 | Nathan et al. |
| 2007/0124795 A1 | 5/2007 | McKissick et al. |
| 2007/0129952 A1 | 6/2007 | Kenyon et al. |
| 2007/0136781 A1 | 6/2007 | Kawai |
| 2007/0156524 A1 | 7/2007 | Grouf et al. |
| 2007/0156525 A1 | 7/2007 | Grouf et al. |
| 2007/0157224 A1 | 7/2007 | Pouliot et al. |
| 2007/0157231 A1 | 7/2007 | Eldering et al. |
| 2007/0157247 A1 | 7/2007 | Cordray et al. |
| 2007/0220566 A1* | 9/2007 | Ahmad-Taylor ............ 725/89 |
| 2007/0261088 A1* | 11/2007 | Phillips et al. ............ 725/97 |
| 2008/0133701 A1* | 6/2008 | Kazmi et al. ............ 709/217 |

FOREIGN PATENT DOCUMENTS

| | | |
|---|---|---|
| GB | 2425909 A | 11/2006 |
| WO | WO9950988 | 10/1999 |
| WO | WO2004038982 | 5/2004 |
| WO | WO2006105604 | 10/2006 |
| WO | WO2006115478 | 11/2006 |
| WO | WO2006117777 | 11/2006 |
| WO | WO2007030328 | 3/2007 |
| WO | WO2007068119 | 6/2007 |

OTHER PUBLICATIONS

Takeshi Yoshimura, Mobile streaming media CDN enabled by dyanmic SMIL, May 7, 2002, Pages All.*

Bob Tedeschi, Retailers shortcut from desktop to store, Sep. 24, 2007, Pages All.*

* cited by examiner

Slot Dashboard

| General | Publishers | Assests | Advertisers | Admin | Supervisor | Reporting |

Dashboard | Traffic

Publisher: Music Video Network
Property: Music Video Network
Page: www.musicvideonet.com
Channel: All Star Music Videos
Flight Dates: 10/25/2006 thru 12/31/2006
Slot: 1-Pre-roll ad Slot Options | Scheduled Campaigns | Scheduled Creatives | Costs | Performace Slot Name: Pre-roll ad
Order: 1
Seconds: 30
Type: Advertiser Content Video Options:
- ☐ Can Pause
- ☐ Can Seek
- ☒ Can Skip Back
- ☒ Can Skip Forward
- ☒ Pre Buffer?
- ☒ Show While Buffering Save Slot

*FIG. 3*

Channel Dashboard

General | Publishers | Assests | Advertisers | Admin | Supervisor | Reporting

Dashboard | Traffic

Publisher ☒ Music Video Network
Property ☐ Music Video Network
Page ☐ www.musicvideonet.com Channel Name [All Star Music Video]

Options | Slots | Scoring | Performance | Tags | Fod Cast Files

- ☐ Music Video Network-page-3416_dull_shine30.mov
- ☐ Music Video Network-zmer-6163_batting_practice_31pt_30.mov
- ☐ Music Video Network-mp_madonna_hung_up.mov
- ☐ Music Video Network-Madonna - Sorry
- ☐ Music Video Network - Chris Issac "Wicked Games"

Add Slot

Slot Type [Advertiser Content ▼]
Slot Name [_____]

[Add Slot]
[Add standard pre-roll/pubslots]

*FIG. 4*

Creative Insertion

General | Publishers | Assests | Advertisers | Admin | Supervisor | Reporting

| | | | | | |
|---|---|---|---|---|---|
| Advertiser | ○ Music Video Network | | Publisher | ☒ Music Video Network | |
| Customer | ☒ Music Video Network | | Property | ☐ Music Video Network | |
| Brand | ☐ Music Video Network | | Page | ☐ www.musicvideonet.com | |
| Campaign | + Music Video Network Videos | | Channel | ○ All Star Music Videos | |
| Insertion | ○ All Star Music Videos | | Slot | ☐ Pre-roll ad | |
| Creative | pgpa_3416_dull_Shine_30.mov ▽ | | | | |

Creative Insertions Settings

| | |
|---|---|
| Creative | pgpa_3416_dull_shine_30.mov |
| Start Date | 10/25/2006  0000 |
| End Date | 12/31/2006  2359 |
| Weight | 100 |
| Order | 0 |
| Targeted? | ☐ Is Targeted? |
| Save | |

Targeting | Geo Targeting | Tags | Performances

Targeting

| Segment | Months | Operand | Score |
|---|---|---|---|
| No records to display | | | |

Add Target

| | |
|---|---|
| Segment | Athletics ▽ |
| Months | |
| Operand | At Least ▽ |
| Score | |
| | Add Score |

*FIG. 5*

Creative Insertion

| General | Publishers | Assests | Advertisers | Admin | Supervisor | Reporting |
|---|---|---|---|---|---|---|

| Advertiser | ○ Music Video Network | | Publisher | ⊞ Music Video Network |
|---|---|---|---|---|
| Customer | ⊞ Music Video Network | | Property | □ Music Video Network |
| Brand | □ Music Video Network | | Page | □ www.musicvideonet.com |
| Campaign | + Music Video Network Videos | | Channel | ○ All Star Music Videos |
| Insertion | ○ All Star Music Videos | | Slot | □ Pre-roll ad |
| Creative | pgpa_3416_dull_Shine_30.mov ▽ | | | |

Creative Insertions Settings

| Creative | pgpa_3416_dull_shine_30.mov |
|---|---|
| Start Date | 10/25/2006 □ 0000 |
| End Date | 12/31/2006 □ 2359 |
| Weight | 100 |
| Order | 0 |
| Targeted? | □ Is Targeted? |
| Save | |

| Targeting | Geo Targeting | Tags | Performances |
|---|---|---|---|

| | Country | Region | City | Include-Exclude | | |
|---|---|---|---|---|---|---|
| ☒ | MONGOLIA | · | · | Exclude | | |
| ☒ | UNITED STATES | · | · | Include | | |
| ☒ | UNITED STATES | NEW JERSEY | · | Include | | |
| ☒ | UNITES STATES | NEW JERSEY | WEEHAWKEN | Include | | |

Add Geo Target

| Country | — | ▽ | Target | Exclude |
|---|---|---|---|---|
| Region | Unbound | ▽ | Target | Exclude |
| City | Unbound | ▽ | Target | Exclude |

*FIG. 6*

SYSTEM AND METHOD FOR DYNAMIC BROKERING OF DIGITAL CONTENT REQUESTS

FIELD OF THE INVENTION

The present invention relates to the field of digital content distribution, such as the request, delivery/fulfillment, accounting, and/or optimization of On-Demand digital content (ex—video, audio, image, or other data) in the context of Internet Protocol (IP) network schemas involving a plurality of player clients, delivery channels and technologies, and particularly to a system and method for dynamic brokering of digital content requests.

BACKGROUND OF THE INVENTION

In recent years, the number and types of devices, client software technologies, and delivery infrastructures relating to the distribution of digital content has increased at a rapid rate. Correspondingly, a greater degree of sophistication has been required to deploy the digital content in an effective and measurable manner across an ever-increasing variety of platforms, operating systems and devices. Therefore, a number of specialty technologies have been created, particularly in the area of delivery of digital content, for the purpose of providing a consistently high quality content delivery experience. Currently, digital content delivery solutions such as content delivery networks (CDNs) and their mobile media and television counterparts dominate the field. As a result, delivery infrastructure has become increasingly distinct from its presentation layer, said presentation layer being a television (TV) channel, a Web Site, a Mobile Media Portal or any number of consumer-facing environments. This change, along with an increasing need for precisely scripted delivery of content, audience targeting and media measurability, has created a need for a technology which can merge the full range of platforms, infrastructures and human needs together, in an articulate, yet highly flexible manner.

Thus, it would be desirable to provide a system and method for digital content distribution which addresses the problems associated with current solutions.

SUMMARY OF THE INVENTION

Accordingly, an embodiment of the present invention is directed to a system for providing dynamic brokering of digital content requests, the system including: a conditional scheduler configured for appropriating location data pertaining to digital content and metadata pertaining to the digital content via a communicative coupling with a content management system, the conditional scheduler being further configured for producing schedule data pertaining to the digital content and delivery rules pertaining to the digital content; and a plurality of content broker servers, each content broker server being configured for communicatively coupling with the conditional scheduler, each content broker server further configured for receiving content data from the conditional scheduler, the content data including the content location data, the schedule data and the delivery rules from the conditional scheduler, each content broker server being further configured for communicatively coupling with and receiving a digital content request from a client player, each content broker server further configured for assembling a set of content retrieval instructions when a digital content request is received from the client player, the content broker server further configured for providing a playlist to the client player, the playlist including the dynamically assembled set of content retrieval instructions, wherein the content retrieval instructions are assembled based upon the content data.

An additional embodiment of the present invention is directed to a method for providing dynamic brokering of digital content requests, said method including: receiving a digital content request from a client player; retrieving available information included in the digital content request; applying content delivery rules against the request, said content delivery rules being related to the requested content; assembling a set of content retrieval instructions, said content retrieval instructions being assembled based upon the application of the content delivery rules against the request; and providing a playlist to the client player, the playlist including the dynamically assembled set of content retrieval instructions.

A further embodiment of the present invention is directed to a computer-readable medium having computer-executable instructions for performing a method for providing dynamic brokering of digital content requests, said method including: receiving a digital content request from a client player; retrieving available information included in the digital content request; applying content delivery rules against the request, said content delivery rules being related to the requested content; assembling a set of content retrieval instructions, said content retrieval instructions being assembled based upon the application of the content delivery rules against the request; and providing a playlist to the client player, the playlist including the dynamically assembled set of content retrieval instructions.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 is a screen shot of an application screen illustrating a primary component structure of a channel schedule (ex—a slot) and its basic attributes and performance settings, said application screen being implemented by an exemplary embodiment of the system of the present invention;

FIG. 4 is a screen shot of an application screen illustrating a hierarchy of slots within a channel schedule, each slot containing content items for display, said application screen showing classification settings (ex—slot type) for permitting scheduling and tracking of editorial/entertainment content distinctly from advertising content, said application screen being implemented by an exemplary embodiment of the system of the present invention;

FIG. 5 is a screen shot of an application screen illustrating schedule settings/delivery settings/delivery rules (ex— weight, order, start/end dates, and behavioral/segment targeting specifications) against specific content items, said rules forming the basis for construction, such as at the time a client player requests the content, of dynamic & distinct playout and/or retrieval instructions (ex—playlists), said application screen being implemented by an exemplary embodiment of the system of the present invention;

Figure 7:
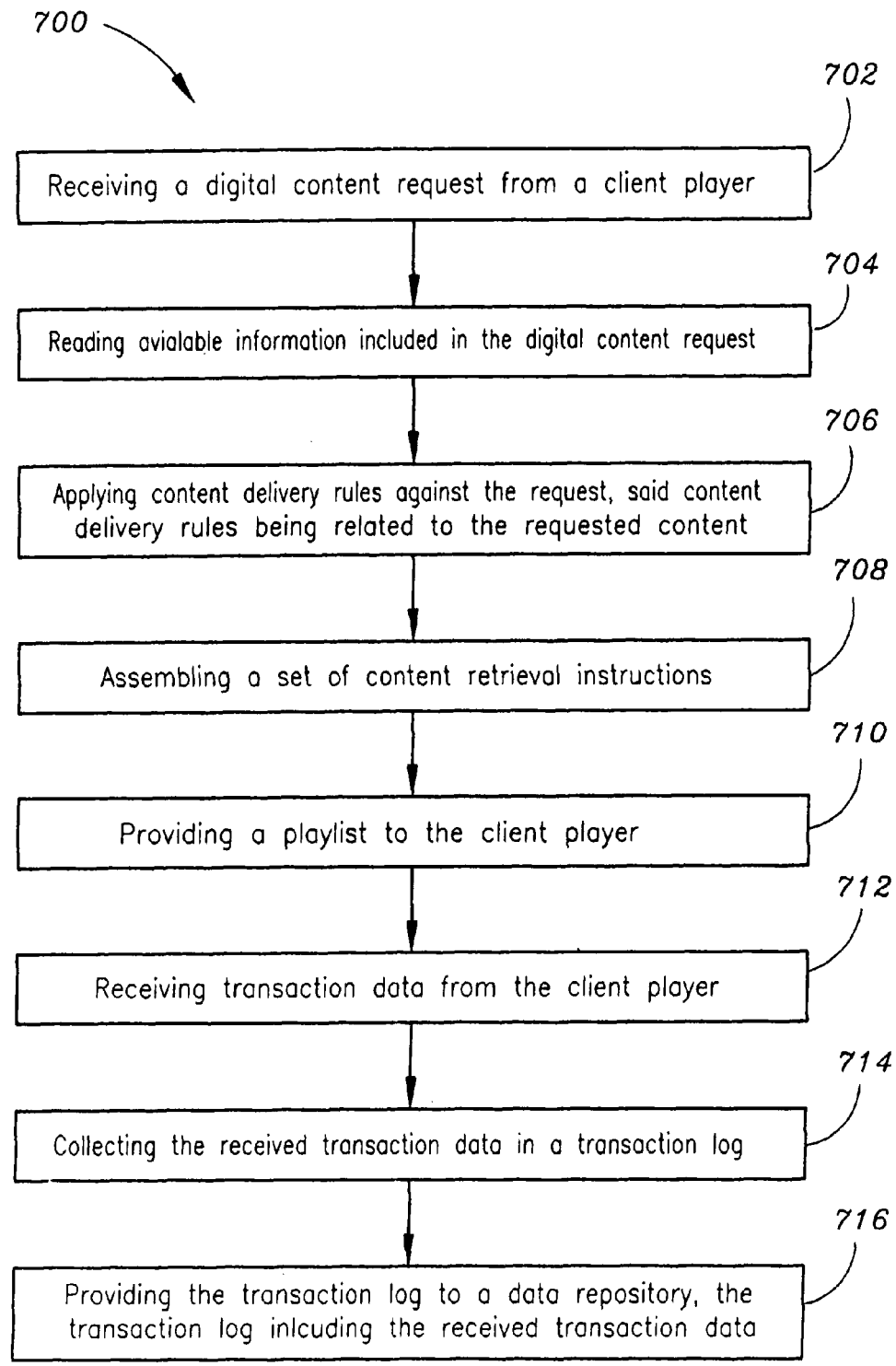

FIG. 6 is a screen shot of an application screen illustrating schedule settings/delivery settings/delivery rules (ex—geo-targeting specifications) against specific content items, said rules forming the basis for construction, such as at the time a client player requests the content, of dynamic & distinct playout and/or retrieval instructions (ex—playlists), said application screen being implemented by an exemplary embodiment of the system of the present invention; and FIG. 7 is a flow chart illustrating a method for providing dynamic brokering of digital content requests in accordance with an exemplary embodiment of the present invention.

DETAILED DESCRIPTION OF THE INVENTION

The present invention applies a flexible, distributed deployment architecture, which is scaled horizontally and redundantly. A purpose and function of the present invention is to broker digital content requests of various client players, across many digital platforms, utilizing any delivery infrastructure and any delivery protocol. Further, the present invention is based on a premise of conditional delivery, which allows broker technology to dynamically employ a set of delivery rules or conditions at the time that a client player digital content request occurs, thereby further allowing retrieval instructions to be rendered that are adjusted to the relevant circumstances of the request (ex—requestor, client location/geography, IP address, user/agent string, time of day, date, unique user ID/cookie, subscriber data, compiled and inferred user profile data, content classification data, delivery network characteristics, file attributes, type/version of client player, targeting segment, and other accessible data elements relating to the request).

The present invention's ability to respond contextually and uniquely to each content request, as it happens, may be advantageous to publishers, advertisers and consumers in any digital content exchange scenario. Additionally, the ability of the present invention to collect and process detailed transaction level data relating to said digital content exchanges may also be advantageous in that it may promote the creation of improved intelligence around content presentation, and may further promote a better understanding of how content and commerce interrelate.

The present invention provides a distinct departure from traditional media scheduling and prior conceptual and procedural treatments of playlisting (a playlist representing, historically, a somewhat static set of content retrieval instructions connected with a streaming solution). Further, the present invention is not bound to a specific delivery technology or solution (ex—download, broadcast, streaming, etc.). Still further, the present invention is not tied to a specific content storage or delivery architecture.

Reference will now be made in detail to the presently preferred embodiments of the invention, examples of which are illustrated in the accompanying drawings.

Figure 1:
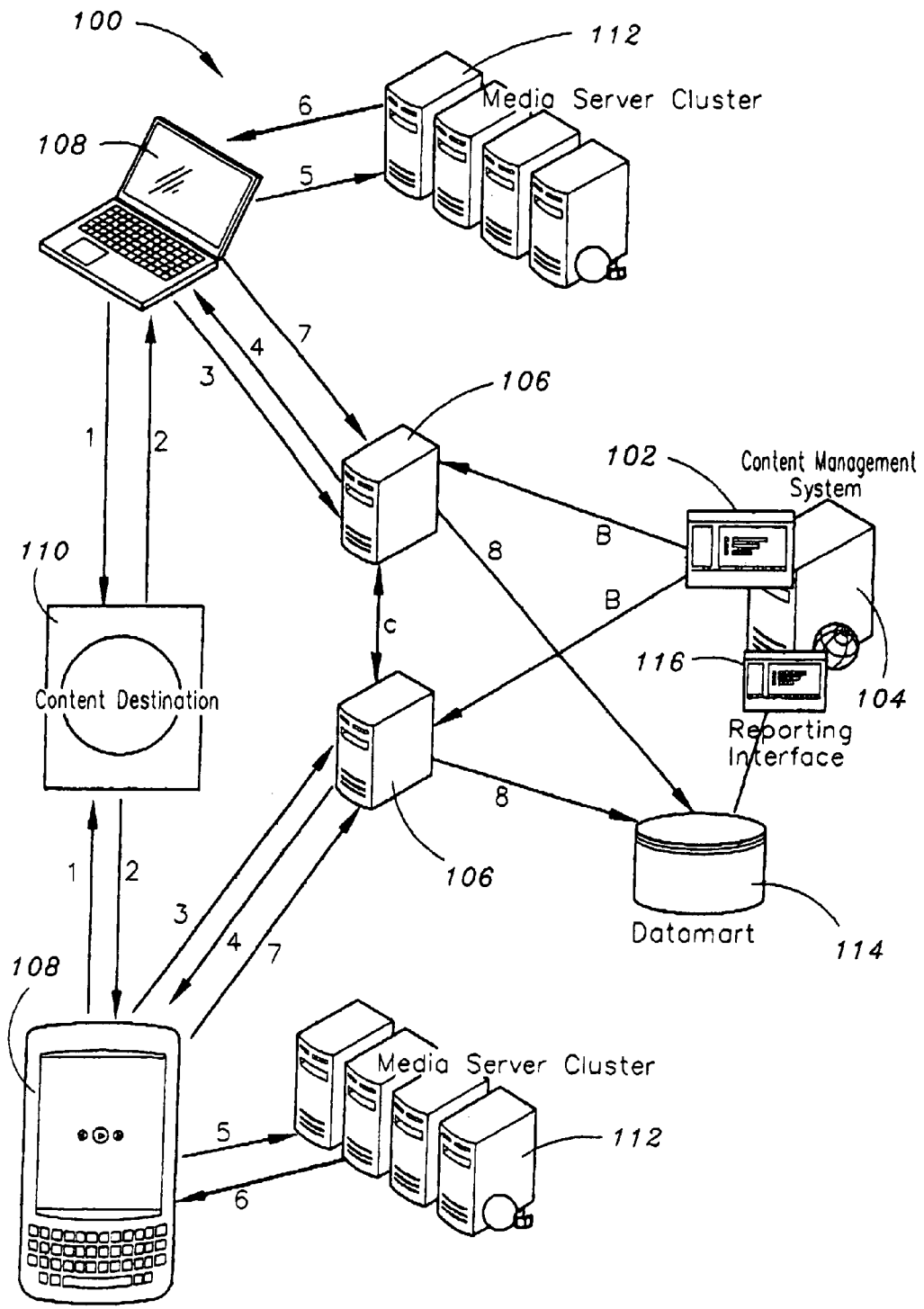
FIG. 1 is a block diagram schematic of a system for providing dynamic brokering of digital content requests in accordance with an exemplary embodiment of the present invention.

FIG. 1 is a block diagram schematic of a system for providing dynamic brokering of digital content requests in accordance with an exemplary embodiment of the present invention. In exemplary embodiments, the system 100 is configured for dynamically handling or brokering real-time requests for digital content in such a manner as to produce instructions to a client player 108 which allow for efficient retrieval of the requested content, while applying delivery rules relating to the content and the requestor. For instance, said delivery rules may be established by a publisher of the content. FIG. 1 also illustrates two distinct data flows: 1) the flow of scheduling rules and metadata from a conditional scheduler 102 (ex—content scheduling module, scheduling software module) to one or more remote content broker systems 106 (ex—brokering servers); and 2) the progression of transactions which begin with a client player request for digital content, which results in the issuing of retrieval instructions, and the delivery of a full transaction history back to a central reporting server and repository 114.

In the illustrated embodiment, the system 100 includes a conditional scheduler 102. In exemplary embodiments, the conditional scheduler 102 may be communicatively coupled and/or integrated, such as via software integration, with a content management system 104. The conditional scheduler 102 is configured, via said integration with the content management system 104, for obtaining/appropriating locations (such as locations within a delivery infrastructure) of digital content. For instance, the digital content may be video, audio, image or other data. In further embodiments, the conditional scheduler 102 is configured, via said integration with the content management system 104, for obtaining/appropriating metadata relating to the content. For example, the metadata may be suitable for utilization in publishing, such as to describe the content.

Figure 2:
FIG. 2 is a screen shot of an application screen illustrating a channel dashboard/channel structure, said application screen being implemented by an exemplary embodiment of the system of the present invention.

In further embodiments, the conditional scheduler 102 is configured for selecting, allocating and/or grouping the content into/within channel schedules/channels, such as is shown in FIG. 2. For example, the channel schedules may be organized around playout venues, such as web pages or mobile media portals. (ex—content destination 110). In a current embodiment of the present invention, the conditional scheduler 102 is further configured for sub-grouping/sub-allocating the content into slot schedules/slots, such as is shown in FIGS. 3 and 4. Within the slot schedules, specific delivery rules (ex-conditional delivery instructions) pertaining to the content may be applied (ex—weight, order, start-end/flight dates, behavioral/segment targeting specifications, geo-targeting specifications—as shown in FIGS. 5 and 6) based upon the conditional scheduler applying the content location information and/or the content metadata, which was received by the content scheduler 102 via its integration with the content management system 104. For example, the delivery rules/delivery settings/schedule settings may be applied against specific content items. In additional embodiments, the slot schedules may contain the content metadata and the conditional delivery instructions, thereby forming the framework for a plurality of potential client player/client device-specific retrieval instructions to be provided, such as at the time of a content request, to a client player(s) in the form of a playlist(s).

In exemplary embodiments, the type of available or active content, classification of the content and/or delivery rules/instructions/preferences applicable to the content may be established or controlled by a controller of the system 100, a publisher of the content, or an advertiser of the content. For instance, the delivery rules may be controlled at a distribution destination for the content (i.e., at channel-level), which may be within a plurality of digital display or publishing environments, such as a Video-On-Demand (VOD) environment, a website, a mobile network, or the like. In further embodiments, the type of available or active content, classification of the content and/or delivery rules/instructions/preferences applicable to the content may be established or controlled at slot-level (i.e. at discreet positions within a channel schedule, i.e. slots). In still further embodiments, the type of available or active content, classification of the content and/or delivery rules/instructions/preferences applicable to the content may be established or controlled at an asset level, an asset being a discreet unit of the content.

In an exemplary embodiment, the conditional scheduler 102, via its integration with the content management system 104 is configured for propagating data to one or more remote content broker systems 106 (ex—broker servers), said remote content broker systems 106 being communicatively coupled with the conditional scheduler 102 and the content management system 104. The propagated data (ex—content data) may include channel schedule/channel data, slot schedule/slot data, conditional delivery rules/instructions/preferences, specific delivery rules/instructions/preferences, scheduling rules/instructions/preferences, content metadata, content location data, or the like. In a current embodiment of the present invention, the remote content broker systems 106 may scale horizontally for creating failover redundancy across their full network deployment. In further embodiments, once the remote content broker systems 106 have received/loaded the propagated data, they may await inbound content requests from client players 108, which may be communicatively coupled with remote content broker systems 106. When a content request is received by the remote content broker system 106 from a client player 108, the remote content broker system 106 may be configured for dynamically generating a client player-specific set of content retrieval instructions, without further reference to or communication with the conditional scheduler 102. Each remote content broker system 106 may be independently capable of dynamically generating and providing a client player-specific set of content retrieval instructions to a client player 108 in response to a received content request from the client player 108.

In further embodiments, each client player 108 is configured for initiating a call/request for content (1) by accessing content destination 110, such as by communicatively coupling with a network. Content destination 110 may be a website, a television channel, a mobile media portal, a presentation layer, a digital display environment, a publishing environment, a consumer-facing environment, an application screen, a playout venue, or the like. In exemplary embodiments, the client player 108 may be a personal computer (PC), a mobile device, or the like. The goal of the call/request for content may be to locate, and stream/download digital content (such as video, image, audio or other data) to the client player 108. In additional embodiments, server-side instructions may be received by the client player 108 at or via content destination 110 (2), said server-side instructions allowing for re-directing of the initial request (3) to a remote content broker system 106 which is most proximal to the client player 108 and resides on the client player's network.

In exemplary embodiments, the remote content broker system 106 is configured for receiving and reading the incoming request. The remote content broker system 106 is further configured for reading other relevant available information included in the request, such as a unique user ID or cookie, a user/agent string, a time/date of request, a targeting segment, subscriber data, compiled/inferred user profile data, content classification data, delivery network characteristics, file attributes, type/version of client player, requesting Internet Protocol (IP), requestor data, client location/geography, IP address, asset/content ID, channel ID, slot ID, and other accessible data elements relating to the request. In further embodiments, the remote content broker system 106 is configured for comparing and applying the conditional delivery rules related to the content against the request/to the request and the other relevant available information included in the request. For instance, the conditional delivery rules may be locally maintained by the remote content system 106 as content delivery logic.

In additional embodiments, the remote content broker system 106 is configured for assembling, such as dynamically assembling, a complete set of content retrieval instructions, which may be client player-specific (ex—in a format appropriate to the client player). Still further, the remote content broker system 106 is configured for providing the content retrieval instructions to the communicatively coupled client player 108 (such as via lightweight network transactions) for use by the client player in retrieving the requested content (4). In a current embodiment of the present invention, the content retrieval instructions are provided to the client player in the form of a playlist. The playlist may be constructed to include client player-specific playlist instructions generated at the time of the request based upon/utilizing the channel schedules, slot schedules, delivery rules, and the like, as they were defined in the conditional scheduler 102.

In further embodiments, the client player 108 is configured for receiving and implementing the playlist (4). In exemplary embodiments, the playlist may primarily include location data, such as file or content locations, relating to the requested content (ex—the content referenced for playout). In additional embodiments, the playlist may also include playlist metadata relating to the content, such as may be used in the presentation or publishing process as the content is delivered into the client player 108. For instance, the playlist metadata may include content descriptions, content classifications and/or file attributes. In current embodiments of the present invention, the playlist may be utilized to direct the requesting client player 108 regarding the retrieval and scripted consumption of the requested available content. Further, the content may include entertainment content, editorial content and/or advertising content (which may supplied as a commercial complement to the requested content).

In exemplary embodiments, the playlist may include any client-side restrictions related to use/consumption of the content. For instance, said restrictions may be enforceable at the client player 108, such as track or slot protection restrictions which may prevent fast-forwarding or skipping of certain content elements. In further embodiments, the content may be remotely cached/stored for delivery by download or stream, such as via the Internet, or across a plurality of dedicated content delivery networks (CDNs), including mobile networks, satellite networks, certain television networks, and via a plurality of delivery protocols.

In current embodiments of the present invention, implementation of the playlist by the client player 108 may include sequentially requesting (5) the content from its storage location(s) (ex—media server(s), which may be combined to form media clusters) 112, the client player 108 configured for communicatively coupling with the media server 112. Sequential requesting of the content may include requesting the content from its storage location(s) (ex—media servers 112), in an order specified by the playlist and/or in accordance with any delivery instructions/restrictions, such as no-skip restrictions, as they were specified during construction of the delivery schedule. Further, the content may be requested as dictated by channel schedules, slot schedules or any client player-specific data included in the playlist which was delivered by the remote content broker system 106. Basically, delivery rules/preferences are applied relating to the client player 108 and the content. Further, in response to the client player content request, the media server 112 is configured for providing or delivering (6) content to the communicatively coupled client player 108 based on the rules, data, restrictions, preferences, instructions or the like, included in the playlist. For example, the content may be provided to and received by the client player 108 via stream or download.

In exemplary embodiments, the client player 108 may be configured for creating, collecting and/or providing transaction data (ex—data relating to retrieval/playout of the content) to the remote content broker system 106 via a series of outbound calls (7). For instance, the calls may contain content delivery and usage information (ex—duration of play, content play completion, pause, skip, etc.). Further, the calls may contain information relating to content retrieval quality and playout experience, such as rate of download (or class of delivery, as may be the case in controlled performance networks), buffer time, records of each unique request and brokered response. In further embodiments, said transaction data associated with content requests may be created, collected and stored at a channel, slot and/or asset level.

In additional embodiments, the remote content broker system(s) 106 is/are configured for receiving the transaction data from the client player(s) 108 via the series of outbound calls. Further, the remote content broker system(s) 106 may be configured for collecting said received transaction data in logs (ex—data specific text logs) which may contain all of the data items/information referenced above, including unique identifiers relating to the client players 108 or users of the client players and attributes which define the transactions themselves, such as time of transaction, date of transaction, the server ID, or the like.

In exemplary embodiments, the transaction logs may be retrieved from the remote content broker system(s) 106 and provided to a datamart 114 (ex—log processing system), the log processing system being communicatively coupled with the remote content broker system(s) 106 (8). For instance, the log processing system 114 may be a database or a central data repository for the system. In further embodiments, retrieval of the transaction logs from the remote content broker system(s) 106 and provision of the transaction logs to the log processing system 114 may occur, for instance, at least once every 24 hours. How often retrieval of the transaction logs and provision of the transaction logs to the log processing system 114 occurs may be dictated by information requirements of operators of the system, information requirements of publishing users of the system, information requirements of advertising users of the system, or may be practically determined by the time it takes for transaction volumes to be processed through the remote content broker system(s).

In current embodiments of the present invention, the log processing system 114 is configured for receiving the transaction logs from the remote content broker system(s) 106 and may further be configured for transforming/processing transaction log data included in the transaction logs. For example, processing the transaction log data may include combining/aggregating the transaction log data/transaction records which are derivable from the transaction logs obtained from the plurality of remote content broker systems 106. In further embodiments, the processed transaction log(s) data is available for query/reporting via a reporting interface 116.

In exemplary embodiments, the reporting interface 116 may be a configurable interface which may be communicatively coupled with the log processing system 114, the content management system 104 (the content management system 104 having furnished the conditional scheduler 102 with content/asset locations) and/or the conditional scheduler 102. The reporting interface 116 may be configured for accessing the processed transaction logs data for the purpose of extracting information about how the brokered content was consumed (ex- to obtain performance data, performance reports, etc.). In further embodiments, the processed transaction logs data (ex—performance data) may include aggregated data for any particular asset, which may allow for viewing/interpretation of content at the asset level.

In alternative embodiments, the reporting interface may be employed cooperatively with other data sources for the purpose of performance analysis. The nature of the transaction data, its depth and its transactional detail may provide a system operator, publishing users, or advertising users a detailed report of how content was requested and played-out, along with detail relating to delivery conditions, client-side behavior relating to the content, and detail relating to how retrieval/playout of the content may relate to other behavior which is tracked at a transaction level and processed through the remote content broker system(s) 106. The number of events which may be digitally monitored may be substantial.

In exemplary embodiments, the present invention contemplates performing transaction-based tracking utilizing simple code across a full range of digital media platforms. Further, information obtained from such transaction-based tracking may have high commercial value, in that it may be important to parties (such as advertisers) who want to better understand how their advertising investments, in connection with various types of content, may impact their businesses. For instance, media/content may be digitally tracked against lead events, sales, web site visits, or the like. In further embodiments, the performance data may be interpreted against publisher or advertiser outcomes which are measurable within a digital display environment or a marketing environment. In still further embodiments, the performance data may be analyzed to determine if consumption of the content maps or patterns against consumer types, said consumer types being primarily defined using profiles constructed via collection and statistical association of data over time.

The remote content broker system(s) 106 of the present invention may promote optimal response time to client player content requests due to its/their location(s) at an edge of an optimized delivery network or delivery infrastructure. In further embodiments, the remote content broker system(s) 106 of the present invention may promote maximum uptime by providing logic (ex—delivery rules, content metadata) replication across a fully networked deployment of remote content broker systems 106, the horizontally-scaled deployment further providing automatic failover to a next most proximal remote content broker system 106.

The system 100 of the present invention may allow for adjustment to be made to scheduling data and delivery logic via synchronization events/propagation/communication originated by the content management system 104 (which is integrated with the conditional scheduler 102) and is directed to the remote content broker system(s) 106, said adjusted data/logic being replicated horizontally across the fully content broker networked deployment. The system 100 of the present invention may provide high scalability and controlled transaction efficiency via local logic management at/by the remote content broker system(s) 106 and may also allow provide complete operational independence from the content delivery infrastructure. For example, the remote content broker systems 106 are operationally independent from the media servers 112.

In further embodiments, the content scheduler 102 may be configured for scheduling inter-operatively with third party publishing systems or may function as a full publisher scheduling solution for a plurality of content publisher enterprises. In exemplary embodiments, the system 100 of the present invention may allow for orchestrated delivery of digital content without system-level integration with any of a plurality of Commercial Delivery Solutions, such as Content Delivery Networks (CDNs), Telco Networks, Mobile Delivery Networks, Digital Cable Networks, Digital Broadcast Satellite Networks, etc., while providing transparent, functional integration with all of the above and/or with any other feasible, digitally-based delivery infrastructure (such as by using stored file locations and access credentials/delivery rules, conditions and further, by supporting a plurality of delivery protocols).

In additional embodiments, an asset (ex—discreet unit of content) may have a variety of physical iterations or versions at the file level, each relating to a distinct Client Player technology or optimized delivery scenario (such as a .WMV (Windows Media Video) file grouped with a .FLV (Flash Video) file—both relaying the same viewing experience). In exemplary embodiments, the system 100 of the present invention may allow for automatic provision of a location of an appropriate asset file version relating to the requesting client player 108, or meeting a specific bandwidth condition.

As discussed above, the conditional scheduler 102 may be communicatively coupled or integrated (such as via software integration) with the content management system 104. Said integration may allow for provision by the system 100 of the above-referenced capabilities described herein, including allowing the conditional scheduler 102 to access active content information (including physical file versions and locations) via direct interaction, such as via a database, with the content management system 104. The above-referenced integration may further allow for the relation of performance data (collected during brokered distribution process) to the content/assets (and its/their various file versions) so as to facilitate content performance analysis & to aid in building classifications around content/assets & consumer types.

FIG. 7 illustrates a method for providing dynamic brokering of digital content requests. The method 700 includes the step of receiving a digital content request from a client player 702. The method 700 further includes the step of retrieving and/or reading available information included in the digital content request 704. The method 700 further includes the step of applying content delivery rules against the request, said content delivery rules being related to the requested content 706. The method 700 further includes the step of assembling a set of content retrieval instructions, said content retrieval instructions being assembled based upon the application of the content delivery rules against the request 708. The method 700 further includes the step of providing a playlist to the client player, the playlist including the dynamically assembled set of content retrieval instructions 710. The method 700 further includes receiving transaction data from the client player, said transaction data including information pertaining to retrieval and playout of digital content delivered in response to the content request 712. The method 700 further includes collecting the received transaction data in a transaction log 714. The method 700 further includes providing the transaction log to a data repository, the transaction log including the received transaction data 716.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing dynamic brokering of digital content requests comprising:
   receiving, at a content broker server, data from a content management system, wherein the data includes location information of digital content, channels, channel schedules, slots within the channels, slot schedules, and content delivery instructions for the digital content, and wherein the content management system groups the digital content into the channels, organizes the channels into the channel schedules according to playout venues, allocates the digital content and advertisements into the slots, and organizes the slots into the slot schedules;
   receiving, at the content broker server, a digital content request from a client player;
   applying, by the content broker server, the channel schedules, slot schedules, and content delivery instructions against the digital content request, said content delivery instructions being related to the requested digital content;
   determining, by the content broker server, a set of content retrieval instructions for the client player based upon the application of the channel schedules, slot schedules, and content delivery instructions against the content request, wherein the set of content retrieval instructions includes, for the requested digital content, the location information of the requested digital content, the channel schedules, the slot schedules, and the content delivery instructions; and
   providing, from the content broker server, a playlist to the client player, the playlist including the determined set of content retrieval instructions.

2. A method as claimed in claim 1, further comprising:
   receiving transaction data from the client player, said transaction data including information pertaining to retrieval and playout of digital content delivered in response to the content request.

3. A method as claimed in claim 2, further comprising:
   collecting the received transaction data in a transaction log.

4. A method as claimed in claim 3, further comprising:
providing the transaction log to a data repository, the transaction log including the received transaction data.

5. A method as claimed in claim 1, wherein the content retrieval instructions are client player-specific.

6. A method as claimed in claim 1, wherein the content retrieval instructions are determined in accordance with at least one of the channel schedules and slot schedules of the requested digital content as defined by a conditional scheduler.

7. A method as claimed in claim 1, wherein the playlist includes location data for advertising content complement to the requested digital content.

8. A method as claimed in claim 1, wherein the playlist includes metadata, said metadata including at least one of descriptions, classifications and file attributes pertaining to the requested digital content.

9. A method as claimed in claim 1, wherein the playlist includes client-side restrictions related to consumption of the requested digital content.

10. A method as claimed in claim 1, wherein the playlist directs the requesting client player regarding retrieval and scripted consumption of available requested content.

11. A non-transitory computer-readable storage medium having computer-executable instructions for performing, at a content broker server, a method for providing dynamic brokering of digital content requests, said method comprising:
receiving data from a content management system, wherein the data includes location information of digital content, channels, channel schedules, slots within the channels, slot schedules, and content delivery instructions for the digital content, and
wherein the content management system groups the digital content into the channels, organizes the channels into the channel schedules according to playout venues, allocates the digital content and advertisements into the slots, and organizes the slots into the slot schedules;
receiving a digital content request from a client player;
applying the channel schedules, slot schedules, and content delivery instructions against the digital content request, said content delivery instructions being related to the requested digital content;
determining a set of content retrieval instructions for the client player based upon the application of the channel schedules, slot schedules, and content delivery instructions against the content request, wherein the set of content retrieval instructions includes, for the requested digital content, the location information of the requested digital content, the channel schedules, the slot schedules, and the content delivery instructions; and
providing a playlist to the client player, the playlist including the determined set of content retrieval instructions.

12. A non-transitory computer-readable storage medium having computer-executable instructions for performing a method for providing dynamic brokering of digital content requests as claimed in claim 11, said method further comprising:
receiving transaction data from the client player, said transaction data including information pertaining to retrieval and playout of digital content delivered in response to the digital content request.

13. A non-transitory computer-readable storage medium having computer-executable instructions for performing a method for providing dynamic brokering of digital content requests as claimed in claim 12, said method further comprising:
collecting the received transaction data in a transaction log.

14. A non-transitory computer-readable storage medium having computer-executable instructions for performing a method for providing dynamic brokering of digital content requests as claimed in claim 13, said method further comprising:
providing the transaction log to a data repository, the transaction log including the received transaction data.

15. A system for providing dynamic brokering of digital content requests, comprising:
a content broker server including at-least a processor to:
receive data from a content management system, wherein the data includes location information of digital content, channels, channel schedules, slots within the channels, slot schedules, and content delivery instructions for the digital content, and
wherein the content management system groups the digital content into the channels, organizes the channels into the channel schedules according to playout venues, allocates the digital content and advertisements into the slots, and organizes the slots into the slot schedules;
receive a digital content request from a client player;
apply the channel schedules, slot schedules, and content delivery instructions against the digital content request, said content delivery instructions being related to the requested digital content;
determine a set of content retrieval instructions for the client player based upon the application of the channel schedules, slot schedules, and content delivery instructions against the content request, wherein the set of content retrieval instructions includes, for the requested digital content, the location information of the requested digital content, the channel schedules, the slot schedules, and the content delivery instructions; and
provide a playlist to the client player, the playlist including the determined set of content retrieval instructions.

16. A system as claimed in claim 15, wherein the content broker server is further to:
receive transaction data from the client player, said transaction data including information pertaining to retrieval and playout of digital content delivered in response to the digital content request.

17. A system as claimed in claim 16, wherein the content broker server is further to:
collect the received transaction data in a transaction log.

18. A system as claimed in claim 17, wherein the content broker server is further to:
provide the transaction log to a data repository, the transaction log including the received transaction data.

19. A system for providing dynamic brokering of digital content requests, comprising:
a computer having a conditional scheduler to appropriate location data pertaining to digital content and metadata pertaining to the digital content via a communicative coupling with a content management system, the conditional scheduler being further to group the digital content into channels, organize the channels into channel schedules according to playout venues, allocate the digital content and advertisements into slots, organize the slots into slot schedules, and produce delivery instructions for the digital content; and
a plurality of content broker servers,
each content broker server being configured for communicatively coupling with the conditional scheduler to receive data from the conditional scheduler, the data including the location data of the digital content, the channels, the channel schedules, the slots, the slot schedules, and the delivery instructions for the digital content, each content broker server being further configured for receiving a digital content request from a client player, each content broker server further configured for dynamically determining a set of content retrieval instructions based on the digital content request received from the client player and the data from the conditional scheduler, wherein the set of content retrieval instructions includes, for the requested digital content, the location data of the requested digital content, the channel schedules, the slot schedules, and the delivery instructions, the content broker server further configured for providing a playlist to the client player, the playlist including the dynamically determined set of content retrieval instructions.

20. A system as claimed in claim 19, wherein the plurality of content broker servers are scaled horizontally for creating failover redundancy across the plurality of content broker servers.

21. A system as claimed in claim 19, wherein each content broker server is configured for receiving transaction data from the client player, said transaction data including information pertaining to retrieval and playout of digital content delivered in response to the digital content request.

22. A system as claimed in claim 21, wherein each content broker server is configured for collecting the received transaction data in a transaction log.

23. A system as claimed in claim 22, wherein each content broker server is configured for being communicatively coupled with a data repository, each content broker server being further configured for providing the transaction log to the data repository, the transaction log including the received transaction data.

24. A system as claimed in claim 23, wherein the data repository is configured for aggregating and processing the received transaction data.

25. A system as claimed in claim 24, further comprising:
a reporting interface configured for being communicatively coupled with the data repository for accessing the aggregated and processed transaction data and extracting performance data from said aggregated and processed transaction data.

26. A system as claimed in claim 25, wherein the plurality of content broker servers are operationally independent from media servers.

* * * * *